United States Patent [19]

Meyn

[11] Patent Number: 5,290,187

[45] Date of Patent: Mar. 1, 1994

[54] APPARATUS FOR SUSPENDING POULTRY FROM ITS LEGS

[75] Inventor: Cornelis Meyn, Oostzaan, Netherlands

[73] Assignee: Machinefabriek Meyn B.V., Oostzaan, Netherlands

[21] Appl. No.: 20,558

[22] Filed: Feb. 22, 1993

[30] Foreign Application Priority Data

Feb. 26, 1992 [NL] Netherlands .................. 9200342

[51] Int. Cl.⁵ .................................... A22C 21/00
[52] U.S. Cl. ........................... 452/178; 452/179; 452/182
[58] Field of Search ........... 452/178, 179, 177, 182, 452/183; 119/97.1, 159

[56] References Cited

U.S. PATENT DOCUMENTS 4,215,654 8/1980 Parker, Jr. .
4,307,683 12/1981 Parker, Jr. .
5,088,959 2/1992 Heemskerk ................. 452/183

FOREIGN PATENT DOCUMENTS 0145077 6/1985 European Pat. Off. .
0355037 2/1990 European Pat. Off. .

Primary Examiner—Willis Little
Attorney, Agent, or Firm—Dority & Manning

[57] ABSTRACT

Apparatus for suspending poultry from its legs, said poultry being supplied by a conveyor, comprising lifting bars extending transversely to the conveyor and applicable against the ankle joint of a bird, being provided with clamping parts cooperating therewith, such as clamping rods which are movable between a position releasing the legs and a position clamping the legs. The clamping rods may be mounted on slides movable to and fro along the bars which for obtaining their motion are provided with follower rolls cooperating with the bar.

9 Claims, 2 Drawing Sheets

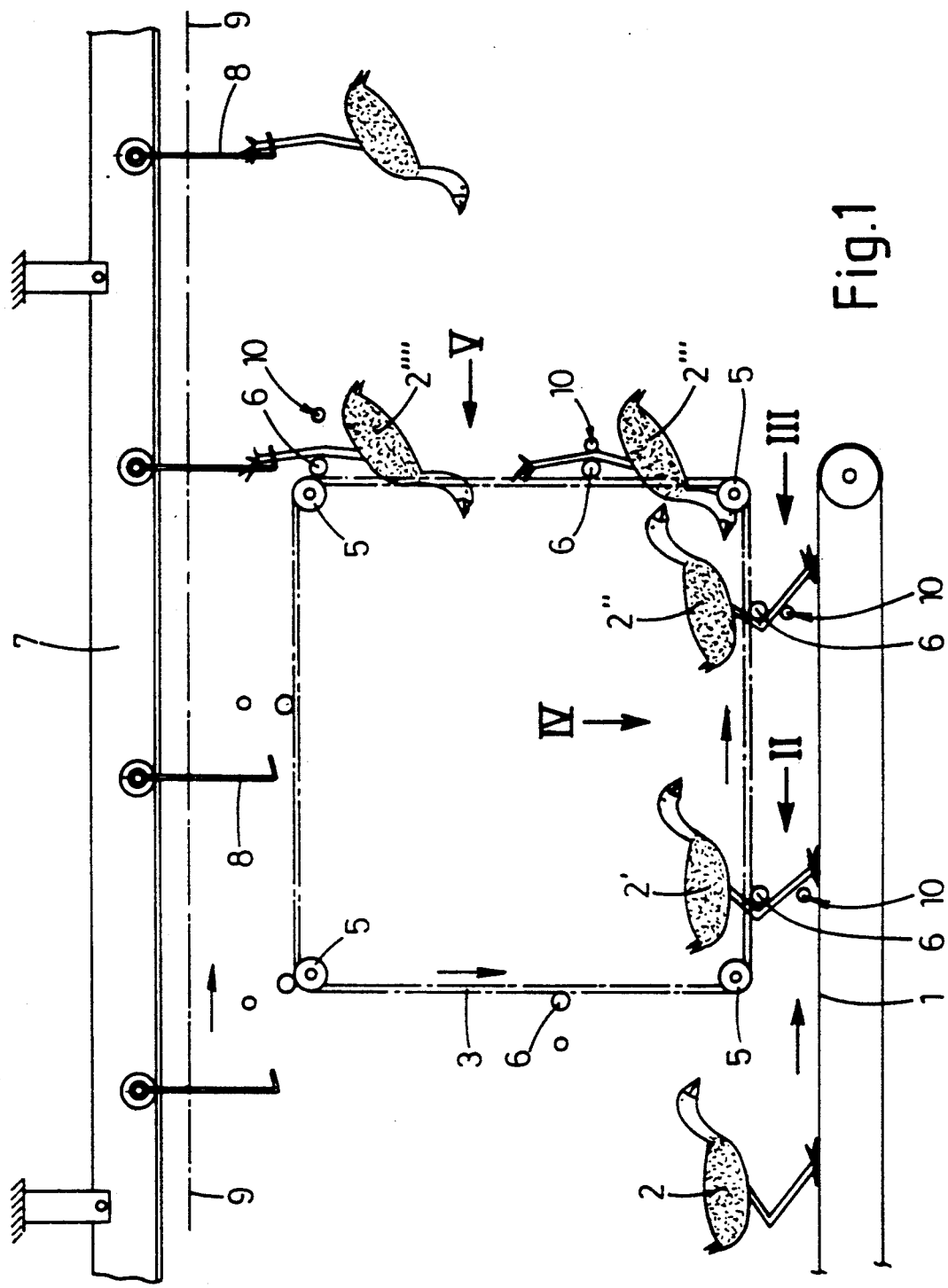

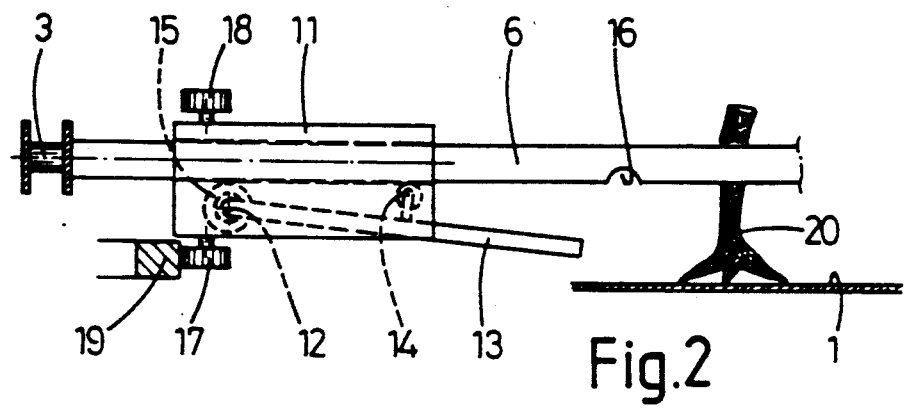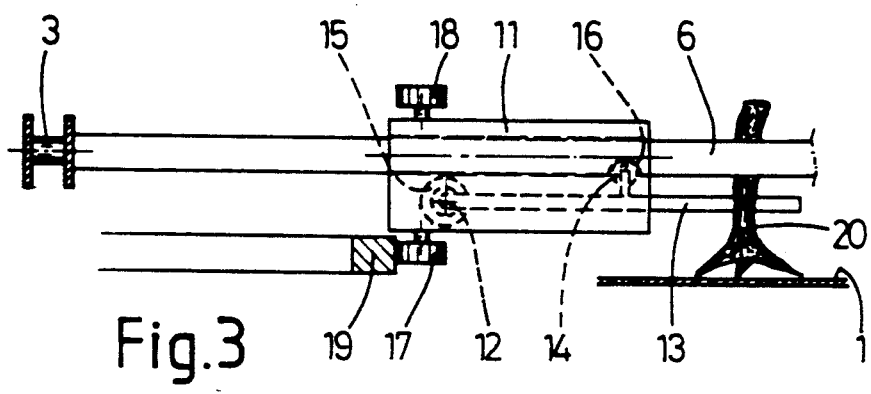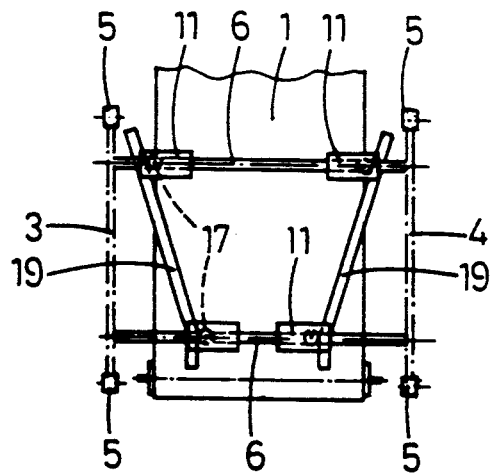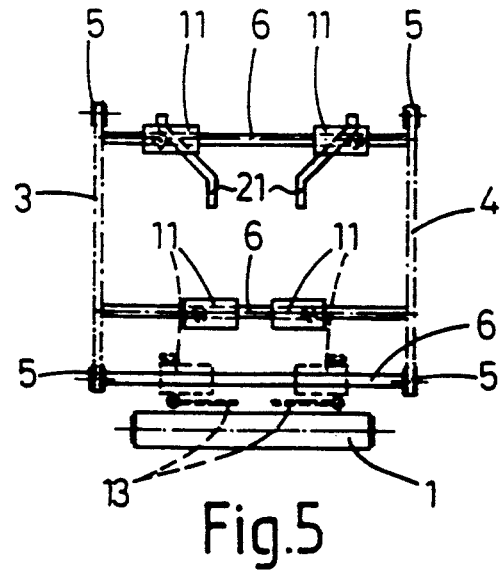

APPARATUS FOR SUSPENDING POULTRY FROM ITS LEGS

The invention relates to an apparatus for suspending poultry from its legs, said poultry being supplied by a conveyor with its head facing in the direction of motion.

In an automatic slaughtering line for poultry the poultry is commonly suspended with its legs from a suspension conveyor. Presently this occurs manually.

It is an object of the invention to provide an apparatus of the type referred to above with which suspending poultry can occur automatedly.

Thus the apparatus according to the invention is characterized by at least one lifting bar extending transversely to the conveyor and applicable against the ankle joint of a bird from the forward side, said bar comprising clamping parts cooperating therewith, which are movable between a position releasing the legs and a position clamping the legs between these clamping parts and the lifting bar, wherein the lifting bar follows a first track section extending in parallel to the conveyor and next a second track section moving away from the conveyor.

The ankle joint of a bird facing with its head in the direction of motion faces forward. Thus, as a result of the supply of the bird by the supplying conveyor the lifting bar is applied against the ankle joint from the forward side. While the lifting bar is still in the first track section the clamping parts clamp the legs. During the transition of the lifting bars from the first track section towards the second track section the legs of the poultry are lifted and the birds will be suspended head down from the lifting bars. In this position the toes of the birds project above the lifting bar and can be engaged in the hooks of a suspension conveyor or alike.

According to a preferred embodiment of the apparatus according to the invention the clamping parts comprise two clamping rods mounted pivotably onto two slides which can move towards and away from each other along the lifting bar wherein the active parts of the clamping rods are distanced further from the lifting bar in the distanced position of the slide then they are in the closer position of the slides. When the slides are in the distanced position they do not obstruct the application of a bird to be suspended against the lifting bar with its ankle joints. In this position the clamping rods are in the release position at some distance from the lifting bar. When the slides are moved towards the more closer position the clamping rods enclose the legs of the bird such as to clamp the legs when they assume their clamping position closer to the lifting bar.

Preferably the clamping rods are provided with follower means cooperating with a guide and enforcing the pivotal movement between the release and clamping positions. Like this the motion of the clamping rods is automatically connected to the motion of the slides along the lifting bar.

In this respect it is possible, that the follower means exist of follower rolls running along the surface of the lifting bar, wherein the clamping rods are spring loaded in the direction of the clamping position and wherein two recesses are formed in the lifting bar for receiving the follower rolls in the clamping position. When the slides are in the distanced position the follower rolls maintain the clamping rods in the release position against the spring load. When the slides are moved towards each other the follower rolls enter the recesses, such that under influence of the spring load the clamping rods are pivoted towards there clamping position.

For realizing the motion of the slides according to a preferred embodiment of the apparatus according to the invention these slides are provided with follower rolls cooperating with stationary guides. Such stationary guides may comprise first stationary guides for moving the slides towards each other in the first track section and second stationary guides for moving the slides apart in the second track section. The first stationary guides create the motion of the slides during clamping the legs of poultry supplied by the supplying conveyor. Using the second stationary guides the legs are freed at that moment, where the legs are received by a suspension conveyor or alike.

In this respect it is desirable if the apparatus is characterized by a suspension conveyor with suspension hooks known per se joining the second track section, wherein a transferring apparatus is applied receiving the legs of poultry supplied by the lifting bar in the second track section and released through the cooperation between the second stationary guides and the slides and which positions the legs in the suspension hooks of the suspension conveyor.

Further an embodiment of the apparatus according to the invention is preferred, in which a number of lifting bars is provided mounted onto two distancedly extending endless chains or alike following substantially rectangular tracks positioned in vertical planes. Due to the application of a number of lifting bars the capacity of the apparatus according to the invention is drastically increased. This simplifies the application of the apparatus in a slaughtering line, in which nowadays high production velocities are required.

Finally it is advantageously if the velocity with which the lifting bars run through the first track section is less then the velocity of motion the conveyor supplying the poultry.

As a result it is guaranteed that the ankle joint of a bird to be suspended is firmly pressed against the respective lifting bar, such that the bird is in the proper position at the moment of activation of the clamping rods.

Hereinafter the invention will be elucidated referring to the drawing, in which an embodiment of the apparatus according to the invention is illustrated.

FIG. 1 shows schematically a side elevational view of the most important parts of an embodiment of the apparatus according to the invention;

FIG. 2 shows according II in FIG. 1 and on a larger scale a detail of the apparatus in a first position;

FIG. 3 shows in correspondence with III the respective section of the apparatus in a second position;

FIG. 4 shows schematically a top plan view of a section of the apparatus according to IV in FIG. 1, and FIG. 5 shows schematically a frontal elevational view of a section of the apparatus according to V in FIG. 1.

In FIG. 1 a supplying conveyor 1 is illustrated by which birds 2 are supplied. Care has been taken that the head of each bird 2 is positioned in the direction of motion of the supplying conveyor 1 indicated by an arrow. This could occur manually, but also by means of an apparatus not shown further.

Above the supplying conveyor 1 two endless chains 3, 4 (see also FIG. 5) extend around chain wheels 5. Transversely to the direction of motion of the supplying conveyor 1 bars 6 extend between the chains 3, 4. By means not shown further the chains 3, 4 are driven in the direction indicated by arrows.

Above the chains 3, 4 a suspension conveyor is provided having a construction known per se and substantially comprising a suspension rail 7, suspension hooks 8 running along said suspension rail and a drive chain 9 mutually connecting those suspension hooks and driving these in the direction indicated by an arrow. The lowermost ends of the suspension hooks 8 are shaped in a way to grip the legs of the birds at the transition between the shank and the toes.

In FIG. 1 it further has been indicated extremely schematically that belonging to each bar 6 there are clamping parts 10 which are movable between a position releasing the legs of the bird and a position clamping the legs of a bird between these clamping parts 10 and the lifting bar 6. The release position is indicated at bird 2', whereas a clamping position is indicated at bird 2". At bird'" hanging head down the clamping parts are in the clamping position too; at the bird 2"" hanging head down they are however in the release position.

The operation of the clamping parts 10 is elucidated in FIG. 2 and 3. These show on a larger scale in correspondence with views II and III in FIG. 1 a section of a bar 6. As can be seen in FIG. 1 the supplied birds 2 are moved in contact with the bars 6 with the ankle joints. To achieve this generally the velocity of motion of the chains 3, 4 will be smaller then the velocity of motion of the supplying conveyor 1.

As appears among others in FIG. 4 and 5 two slides 11 are provided on each bar 6. The construction of these slides 11 will be elucidated referring to FIG. 2 and 3. It is noted that FIG. 2 and 3 only show one half of a bar 6; specifically that half which is connected to chain 3.

The slides 11 are movable to and fro along the bar 6 and carry a clamping rod 13 pivotable around an axis 12. Each clamping rod 13 has mounted thereon a follower roll 14 cooperating with the surface of the respective bar 6. The follower roll 14 is constantly in engagement with the surface of the bar 6 under influence of a spring means, for example torsion spring 15. Finally FIG. 2 shows that a recess 16 is provided in the surface of bar 6 meant for receiving the follower roll 14.

The slides 11 are movable to and fro along the bar 6 between a position in which they are distanced and a position, in which they are closer to each other. The motion of the slides 11 along the bar is generated by follower rolls 17 and 18 provided on the slides 11. FIG. 4, which shows a view in correspondence with IV in FIG. 1, illustrates, that stationary guides 19 are provided below the bars 6 and above the supply conveyor 1, which guides cooperate with the follower rolls 17. Due to the cooperation between the follower rolls 17 and the stationary guides 19 the slides 11 will be moved towards each other. The position indicated in FIG. 4 at the top corresponds with the position of bird 2' in FIG. 1; the position indicated in FIG. 4 at the bottom corresponds with the position of bird 2" in FIG. 1. When the slides 11 move towards each other they move from the position illustrated in FIG. 2 towards the position illustrated in FIG. 3, whereby the follower roll 14 will be received in the recess 16 of bar 6. As a result the clamping rod 13 will move from the release position according to FIG. 2, in which it is at some distance from bar 6, towards the clamping position according to FIG. 3, in which it is closer to the bar 6 and will clamp a leg 20 of a bird. Although in FIG. 2 the ankle joint of the leg 20 was engaging the bar 6, clamping the leg did not yet occur.

After the legs have been clamped in the way illustrated in FIG. 3 the bars 6 will leave the horizontal track section of the chains 3, 4 (between the lower most chain wheels 5) and will move upward in a vertical track section (between both chain wheels 5 positioned at the right handed side). Like this the respective bird is suspended from its legs head down, the legs being clamped between the bar 6 and the clamping rod 13. For example this applies for bird 2"".

During the upward motion of the bars 6 along the vertical track section of the chains 3, 4 (illustrated in a frontal elevational view in FIG. 5) the follower rolls 18 of the slides 11 will engage stationary guides 21. As a result the slides will move back from the position illustrated in FIG. 3 towards the position illustrated in FIG. 2 and the clamping rods 13 will release the legs. The complete release of the legs will occur at that moment on which the legs are gripped by a transferring apparatus not illustrated for applying the legs in the suspension hooks 8 of the suspension conveyor. Like this the birds are transferred from the lifting bars 6 to the suspension hooks 8 and are further removed thereby.

Of course moving the slides 11 to and fro along the bars 6 could occur in other ways too. Instead of a cooperation between the follower rolls 17, 18 and the guides 19, 21 the slides might be operated by cylinder-piston assemblies or other driving means. Further it is possible that instead of two follower rolls 17, 18 just one follower roll is provided on each slide 11 cooperating with guides 19, 21.

Also in respect of the pivotal motion of the clamping rods 13 a number of possibilities occur. Instead of a cooperation between the bar 6 and the clamping rod 13 by means of a follower roll 14, directly driving the clamping rod 13 using driving means known per se is possible.

The invention is not limited to the embodiments described before, which can be varied widely within the scope of the invention.

I claim:

1. Apparatus for suspending poultry from its legs, said poultry being supplied by a conveyor with its head facing in the direction of motion, characterized by at least one lifting bar extending transversely to the conveyor and applicable against the ankle joint of a bird from the forward side, said bar comprising clamping parts cooperating therewith, which are movable between a position releasing the legs and a position clamping the legs between these clamping parts and the lifting bar, wherein the lifting bar follows a first track section extending in parallel to the conveyor and next a second track section moving away from the conveyor.

2. Apparatus according to claim 1, characterized in that the clamping parts comprise two clamping rods mounted pivotably onto two slides which can move towards and away from each other along the lifting bar wherein the active parts of the clamping rods are distanced further from the lifting bar in the distanced position of the slide then they are in the closer position of the slides.

3. Apparatus according to claim 2, characterized in that the clamping rods are provided with follower means cooperating with a guide and enforcing the pivotal movement between the release and clamping positions.

4. Apparatus according to claim 3, characterized in that the follower means exist of follower rolls running along the surface of the lifting bar, wherein the clamping rods are spring loaded in the direction of the clamping position and wherein two recesses are formed in the lifting bar for receiving the follower rolls in the clamping position.

5. Apparatus according to claim 2, characterized in that the slides are provided with follower rolls cooperating with stationary guides.

6. Apparatus according to claim 5, characterized by first stationary guides for moving the slides towards each other in the first track section and by second stationary guides for moving the slides apart in the second track section.

7. Apparatus according to one of the claims 1-6, characterized by a suspension conveyor with suspension hooks known per se joining the second track section, wherein a transferring apparatus is applied receiving the legs of poultry supplied by the lifting bar in the second track section and released through the cooperation between the second stationary guides and the slides and which positions the legs in the suspension hooks of the suspension conveyor.

8. Apparatus according to claim 1, characterized in that a number of lifting bars is provided mounted to two distancedly extending endless chains or alike following substantially rectangular tracks positioned in vertical planes.

9. Apparatus according to claim 1, characterized in that the velocity with which the lifting bars run through the first track section is less then the velocity of motion of the conveyor supplying the poultry.

* * * * *